J. W. CAMPBELL.
UNIVERSAL JOINT.
APPLICATION FILED MAY 12, 1916.
1,199,662.
Patented Sept. 26, 1916.
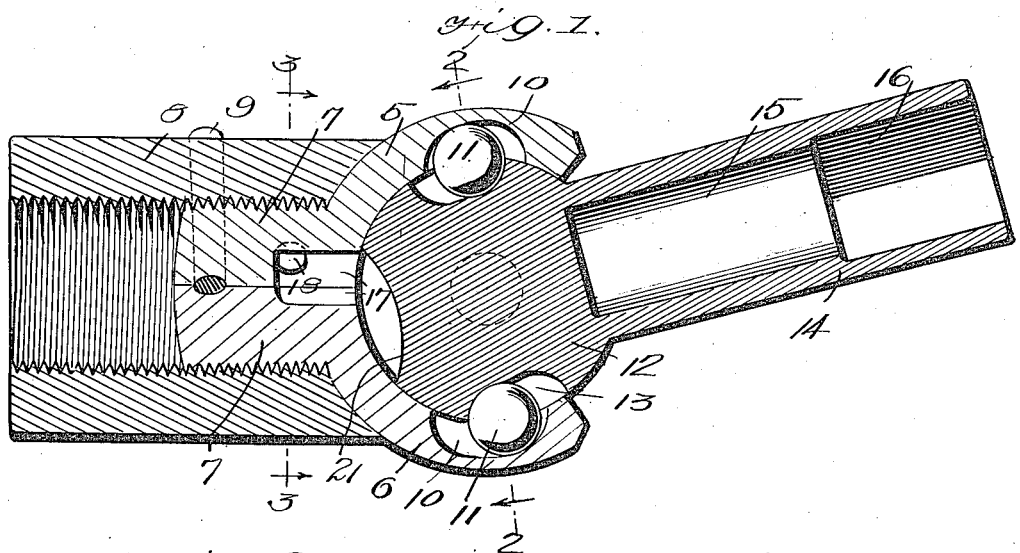
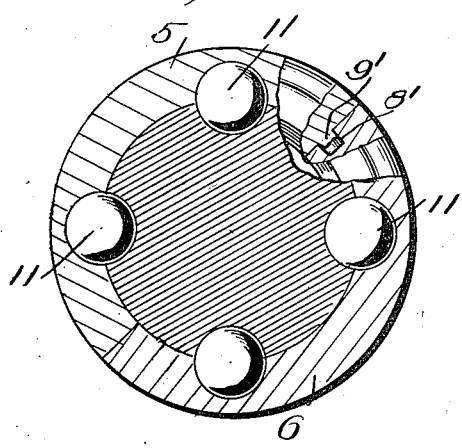
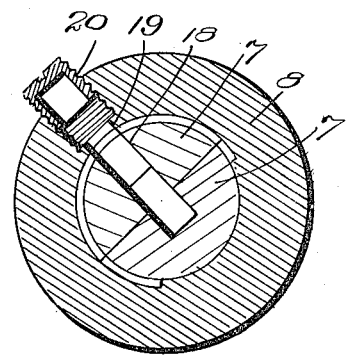
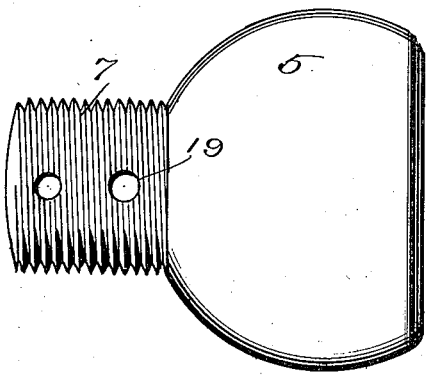
WITNESSES:
INVENTOR
J. W. Campbell
ATTORNEYS

UNITED STATES PATENT OFFICE.

JAMES WILLIAM CAMPBELL, OF DETROIT, MICHIGAN.

UNIVERSAL JOINT.

1,199,662.

Specification of Letters Patent.

Patented Sept. 26, 1916.

Application filed May 12, 1916. Serial No. 97,022.

*To all whom it may concern:*

Be it known that I, JAMES W. CAMPBELL, a citizen of the United States, and a resident of Detroit, in the county of Wayne and State of Michigan, have invented an Improvement in Universal Joints, of which the following is a specification.

This invention is an improvement in couplings, and has particular reference to universal joints.

An object of the invention is to provide a joint employed for connecting adjacent ends of shafts or like elements and which consists of a sectional socket member held in coöperative position by a sleeve element and provided interiorly thereof with a number of grooves for receiving bearing members in the form of balls which also engage in complemental grooves formed in the periphery of the ball member associated with the socket member, said members being also provided with novel means for lubricating the joint.

The inventive idea involved is capable of receiving a variety of mechanical expressions, one of which, for the purpose of illustrating the invention, is shown in the accompanying drawing, in which—

Figure 1 is a longitudinal sectional view of the joint constructed in accordance with the invention. Fig. 2 is a transverse section on the line 2—2 of Fig. 1. Fig. 3 is a similar view on the line 3—3 of Fig. 1. Fig. 4 is a plan view of one of the sections of the socket member.

Referring more particularly to the accompanying drawing, in which like reference characters indicate similar parts, the numerals 5 and 6 indicate the complemental sections of the socket member, each section being provided with externally threaded shanks 7 which have threaded thereon, when the sections of the socket member are in position, an internally threaded retaining sleeve 8, said shanks and sleeve having a tapering locking pin 9 extending diagonally therefrom. The sections 5 and 6 are further retained in position by providing one abutting face with a socket 8' adapted to receive a dowel lug 9'. The spherical portions of the socket member are provided interiorly thereof with a number of grooves 10 in each of which is mounted for longitudinal movement a bearing member 11 in the form of an anti-friction ball, the depth of the grooves 10 being substantially equal to the radius of the ball.

The ball member 12 of the joint is also provided in its periphery with grooves 13 extending in the same direction and of the same size as the grooves 10. These grooves 13 are adapted to register with the grooves 10 and also receive the bearing members 11 whereby the sections of the joint are securely retained in coöperative relation and one of said joint members permitted to freely move relative to the other until any one of the bearing members 11 engages one end of its groove 10 and the opposite end of the groove 13. The shank 14 of the ball member 12 is provided at its inner end with a cylindrical socket 15 which terminates at its outer end in a squared opening 16 adapted to receive the end of a shaft.

The abutting faces of the shanks 7 of the socket member are provided with cavities 17 which form a lubricant containing chamber having an inlet passage 18 extending through one of said shanks and communicating with a bore 19 formed in the sleeve member 8. The bore 19 is closed by means of a suitable cap 20 and lubricant placed in said bore is forced through the passage 18, into said chamber after which the same feeds into the recess 21 formed in the periphery of the ball member 12 and in the extreme end thereof. The lubricant will then feed between the engaging surfaces and into the grooves 10 and 13 of the socket and ball members and thus efficiently lubricate the joint.

What is claimed is:

A universal joint comprising a sectional socket member including externally threaded shanks having cavities in their abutting surfaces for forming a lubricant containing chamber, an internally threaded sleeve mounted upon said shanks and having a bore communicating with said lubricant chamber, means for closing said bore, the interior of the spherical portions of the socket member being provided with grooves, a ball member associated with said socket member and also having grooves similar to the first-named grooves and registering therewith, one extremity of said ball member having a recess which communicates with said lubricant containing chamber, and bearing members mounted in the grooves in said ball and socket members.

JAMES WILLIAM CAMPBELL.